US008618923B2

(12) United States Patent
Nakamura

(10) Patent No.: US 8,618,923 B2
(45) Date of Patent: Dec. 31, 2013

(54) SPEED ALARM SYSTEM

(75) Inventor: Kazumasa Nakamura, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 220 days.

(21) Appl. No.: 12/995,633

(22) PCT Filed: Apr. 3, 2009

(86) PCT No.: PCT/JP2009/056971
§ 371 (c)(1),
(2), (4) Date: Dec. 1, 2010

(87) PCT Pub. No.: WO2009/147896
PCT Pub. Date: Dec. 10, 2009

(65) Prior Publication Data
US 2011/0090076 A1    Apr. 21, 2011

(30) Foreign Application Priority Data
Jun. 2, 2008   (JP) .............................. P2008-144836

(51) Int. Cl.
*B60Q 1/00*   (2006.01)

(52) U.S. Cl.
USPC ............................ 340/441; 340/466; 340/438

(58) Field of Classification Search
USPC ................... 340/441, 466, 438, 439
See application file for complete search history.

(56) References Cited

U.S. PATENT DOCUMENTS 8,032,273 B2 * 10/2011 Yang et al. ................. 701/32.4
8,248,223 B2 * 8/2012 Periwal ...................... 340/441
2002/0173881 A1 * 11/2002 Lash et al. ....................... 701/1
2005/0264404 A1 * 12/2005 Franczyk et al. ............ 340/441
2007/0236342 A1 * 10/2007 Hines et al. .................. 340/438
2008/0211649 A1 * 9/2008 Hines et al. .................. 340/441
2009/0157249 A1 * 6/2009 Yang et al. ..................... 701/29
2010/0045451 A1 * 2/2010 Periwal ...................... 340/439
2010/0045452 A1 * 2/2010 Periwal ...................... 340/439
2010/0121526 A1 * 5/2010 Pham .............................. 701/36

FOREIGN PATENT DOCUMENTS

| JP | 11-211485 A    | 8/1999 |
| JP | 2006-177856 A  | 7/2006 |
| JP | 2007-163214 A  | 6/2007 |

* cited by examiner

Primary Examiner — Travis Hunnings
(74) Attorney, Agent, or Firm — Arent Fox LLP

(57) ABSTRACT

A speed alarm system includes: a vehicle position detecting unit that detects a position of a vehicle; a map data storage unit that stores map data including information on a type of a road and a speed limit of the road; an entrance determining unit that determines whether the vehicle enters a different type of road from the type of the road; an integrated travel distance detecting unit that detects an integrated travel distance on a road which the vehicle has entered and a speed detecting unit that detects a speed of the vehicle on the road which the vehicle has entered, when the entrance determining unit determines that the vehicle enters the different type of road from the type of the road before the vehicle enters; and a notification unit that gives at least an auditory or visual alarm to an occupant of the vehicle when the integrated travel distance is equal to or less than a predetermined distance and the speed of the vehicle is higher than the speed limit.

8 Claims, 4 Drawing Sheets

SPEED ALARM SYSTEM

BACKGROUND OF THE INVENTION

1. Field of the Invention

The present invention relates to a speed alarm system.

Priority is claimed on Japanese Patent Application No. 2008-144836, the content of which is incorporated herein by reference.

2. Description of Related Art

For example, a navigation system has been proposed which acquires the speed limit of the road on which a vehicle travels and gives a warning when the speed of the vehicle is higher than the speed limit (for example, see Japanese Unexamined Patent Application, First Publication No. H11-211485).

In addition, for example, a navigation system has been proposed which informs the driver of the speed limit when the vehicle reaches a predetermined speed notification point (for example, see Japanese Unexamined Patent Application, First Publication No. 2006-177856).

For example, a notification system has been proposed which gives information about the speed limit and notifies the driver that the vehicle is in a soundproof section when the vehicle reaches a predetermined soundproof section (for example, see Japanese Unexamined Patent Application, First Publication No. 2007-163214).

However, in the navigation system disclosed in Japanese Unexamined Patent Application, First Publication No. H11-211485, when the speed of the vehicle is higher than the speed limit, in some cases, warnings are excessively repeated to the driver, which causes a problem in that it makes an occupant in the vehicle nervous.

In the navigation system disclosed in Japanese Unexamined Patent Application, First Publication No. 2006-177856 or the notification system disclosed in Japanese Unexamined Patent Application, First Publication No. 2007-163214, even when the speed of the vehicle is lower than the speed limit, a warning is given to the driver, which causes a problem in that it makes an occupant in the vehicle nervous.

The present invention has been made in order to solve the above-mentioned problems and an object of the present invention is to provide a speed alarm system capable of giving an appropriate speed warning while preventing the occupant in the vehicle from being nervous.

SUMMARY OF THE INVENTION

In order to achieve the object for solving the problem, the present invention has the following configurations.

(1) According a first aspect of the present invention, a speed alarm system includes: a vehicle position detecting unit that detects a position of a vehicle; a map data storage unit that stores map data including information on a type of a road and a speed limit of the road; an entrance determining unit that determines whether the vehicle enters a different type of road from the type of the road; an integrated travel distance detecting unit that detects an integrated travel distance on a road which the vehicle has entered and a speed detecting unit that detects a speed of the vehicle on the road which the vehicle has entered, when the entrance determining unit determines that the vehicle enters the different type of road from the type of the road before the vehicle enters; and a notification unit that gives at least an auditory or visual alarm to an occupant of the vehicle when the integrated travel distance is equal to or less than a predetermined distance and the speed of the vehicle is higher than the speed limit.

(2) In the speed alarm system according to (1), the predetermined distance may vary depending on the type of the road which the vehicle has entered.

(3) In the speed alarm system according to (1), the entrance determining unit may determine whether the vehicle enters a general road with a relatively low speed limit from an expressway with a relatively high speed limit.

(4) In the speed alarm system according to (1), the entrance determining unit may determine whether the vehicle enters a minor street with a relatively low speed limit from a main road with a relatively high speed limit.

In the speed alarm system of the present invention according to (1), even when the type of the road on which the vehicle travels is changed and the occupant (driver) drives the vehicle at a speed higher than the speed limit (that is, the established speed limit allowed by law for the road) without realizing it, it is possible to appropriately warn the occupant that the speed is higher than the speed limit. In addition, the speed alarm system can prevent the occupant in the vehicle from being repeatedly warned against the occupant's will by providing notification only when the integrated travel distance of the vehicle is equal to or less than a predetermined distance.

According to (2), since a predetermined distance where the notice of speeding is permitted varies depending on the type of road, that is, the speed limit of the road, it is possible to appropriately set a traveling period for which the notice of speeding is permitted. Therefore, it is possible to prevent the occupant of the vehicle from becoming nervous.

According to (3), when the vehicle travels from an expressway to a general road with a speed limit lower than that of the expressway, notification can be provided. Therefore, it is possible to appropriately warn the driver that the driver is speeding. As a result, it is possible for the driver to prevent the vehicle from traveling on the general road while maintaining the traveling state of the vehicle on the expressway.

According to (4), when the vehicle travels from a main road to a minor street with a speed limit lower than that of the main road, notification can be provided. Therefore, it is possible to appropriately warn the driver that the driver is speeding. As a result, it is possible for the driver to prevent the vehicle from traveling on the minor street while maintaining the traveling state of the vehicle on the main road.

REFERENCE SYMBOL LIST

10: SPEED ALARM SYSTEM
12: MAP DATA STORAGE UNIT
14: OUTPUT UNIT (NOTIFICATION UNIT)
21: VEHICLE SPEED SENSOR (SPEED DETECTING UNIT)
42: ENTRANCE DETERMINING UNIT
43: INTEGRATED TRAVEL DISTANCE CALCULATING UNIT (INTEGRATED TRAVEL DISTANCE DETECTING UNIT)
44: OUTPUT CONTROL UNIT (NOTIFICATION UNIT)

DETAILED DESCRIPTION OF THE INVENTION

A speed alarm system according to an embodiment of the present invention will be described with reference to the accompanying drawings.

Figure 1:
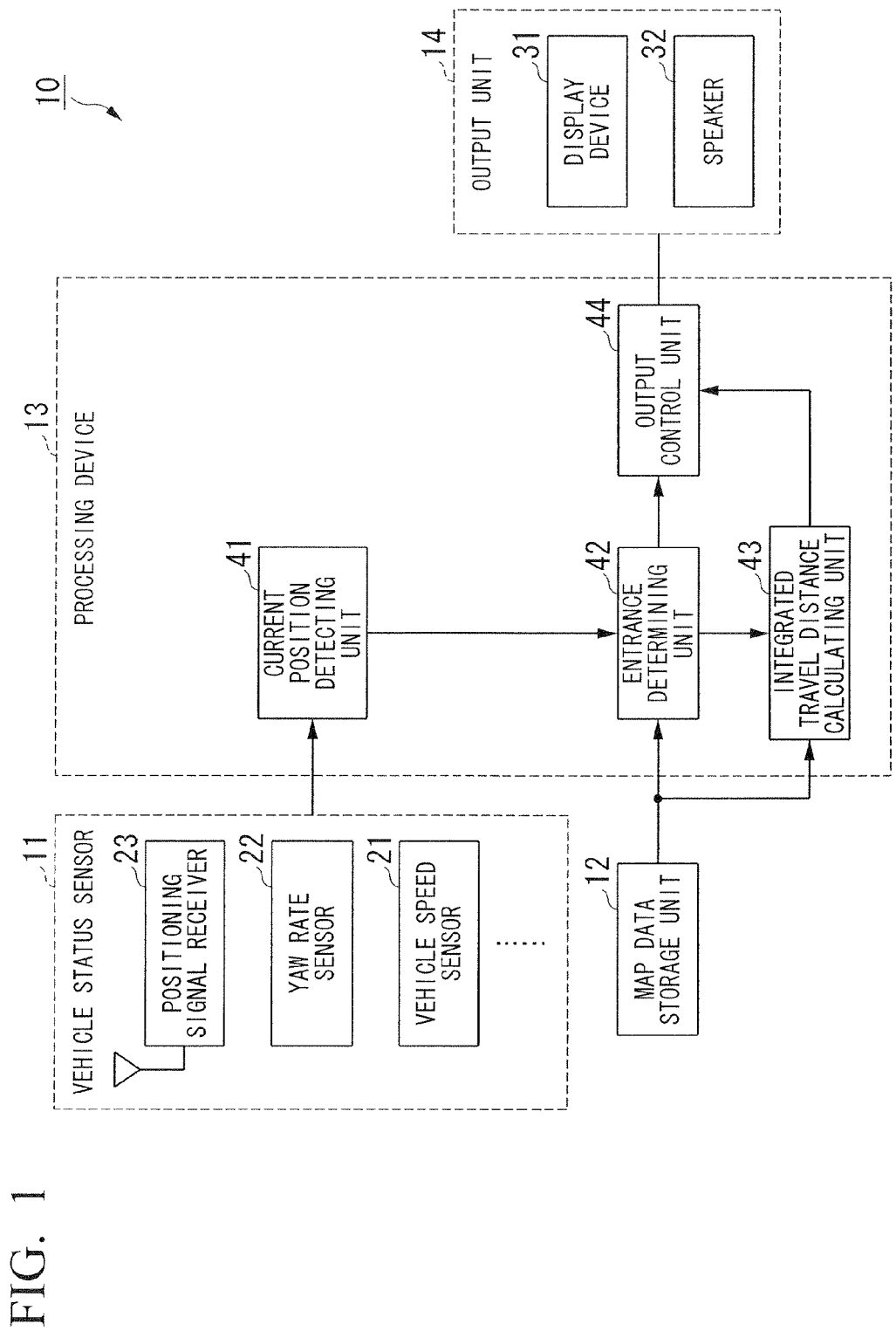
FIG. 1 is a diagram illustrating the structure of a speed alarm system according to an embodiment of the present invention.

As shown in FIG. 1, a speed alarm system 10 according to this embodiment includes, for example, a vehicle status sensor 11, a map data storage unit 12, a processing device 13, and an output unit 14.

The vehicle status sensor 11 includes, for example, a vehicle speed sensor 21 that detects the speed (vehicle speed) of a vehicle as vehicle information, a yaw rate sensor 22 that detects a yaw angle (the rotation angle of the center of gravity of the vehicle with respect to the vertical axis) or a yaw rate (the angular velocity of the center of the gravity of the vehicle about the vertical axis), and a positioning signal receiver 23 that receives a positioning signal, such as a signal of a GPS (Global Positioning System) for measuring the position of the vehicle using an artificial satellite.

The map data storage unit 12 stores, as map data, data required for a path search process or a path guide process, for example, data about each node, which is a point including the latitude and longitude of a predetermined position, such as an intersection, and each link, which is a line linking the nodes, in addition to map display data for displaying a map on a display device 31 of the output unit 14 in, for example, a navigation process of the processing device 13 and road coordinate data required for a map matching process based on the current position of the vehicle. In addition, various kinds of information are added to the node and the link.

For example, in addition to the latitude, longitude, and altitude, information indicating the presence or absence of a signal light or intersection information, such as the intersection angle between a plurality of roads or the shapes of the roads, is added to each node. In addition, information about the type of road (for example, an expressway, a general road, a main road, and a minor street) and the speed limit of the road is added to each link.

The processing device 13 includes, for example, a current position detecting unit 41, an entrance determining unit 42, an integrated travel distance calculating unit 43, and an output control unit 44.

The current position detecting unit 41 calculates the current position of a vehicle using an autonomous navigation calculating process based on the positioning signal received by the positioning signal receiver 23 or the information regarding the state of the vehicle detected by the vehicle speed sensor 21 and the yaw rate sensor 22.

The entrance determining unit 42 determines whether a traveling vehicle enters a different type of road on the basis of the current position of the vehicle output from the current position detecting unit 41 and various kinds of data stored in the map data storage unit 12.

When the entrance determining unit 42 determines that the vehicle enters a different type of road, the integrated travel distance calculating unit 43 calculates the integrated travel distance of the vehicle on the road which the vehicle has entered.

When the entrance determining unit 42 determines that the vehicle enters a different type of road, the integrated travel distance of the vehicle on the road which the vehicle has entered is equal to or less than a predetermined distance, and the speed of the vehicle is higher than the speed limit of the road which the vehicle has entered, the output control unit 44 controls the display device 31 and a speaker 32 of the output unit 14 to give at least a predetermined visual or auditory alarm to the occupant in the vehicle.

Figure 2:
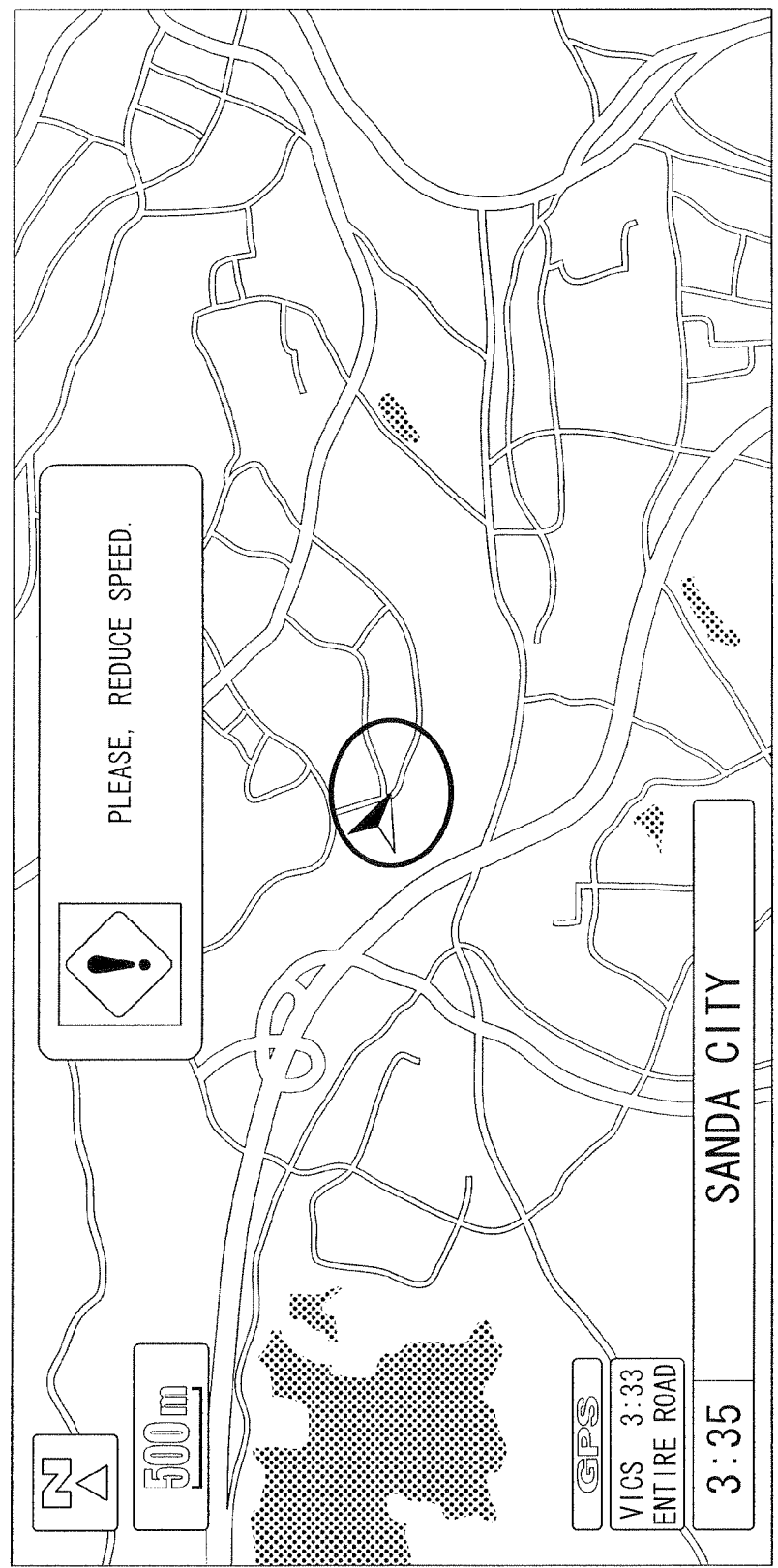
FIG. 2 is a diagram illustrating an example of a display screen of a display device according to the embodiment.

For example, as shown in FIG. 2, the output control unit 44 displays character information of a predetermined message (for example, "PLEASE REDUCE SPEED.") and a predetermined image (for example, the image of an exclamation mark "!") on the map displayed on the display screen of the display device 31 by the navigation process of the processing device 13 such that they are superimposed. In addition, the output control unit 44 controls the speaker 32 to output a predetermined audio message (for example, "Please, reduce the speed.").

A predetermined distance with respect to the integrated travel distance varies depending on the type of road, that is, the speed limit of the road. For example, as the speed limit of the road is reduced, a predetermined distance is set to be reduced.

The speed alarm system 10 according to the embodiment has the above-mentioned structure. Next, the operation of the speed alarm system 10 will be described.

First, a process when the vehicle enters a different type of road, for example, when the type of road on which the vehicle travels changes from an expressway to a general road will be described below.

Figure 3:
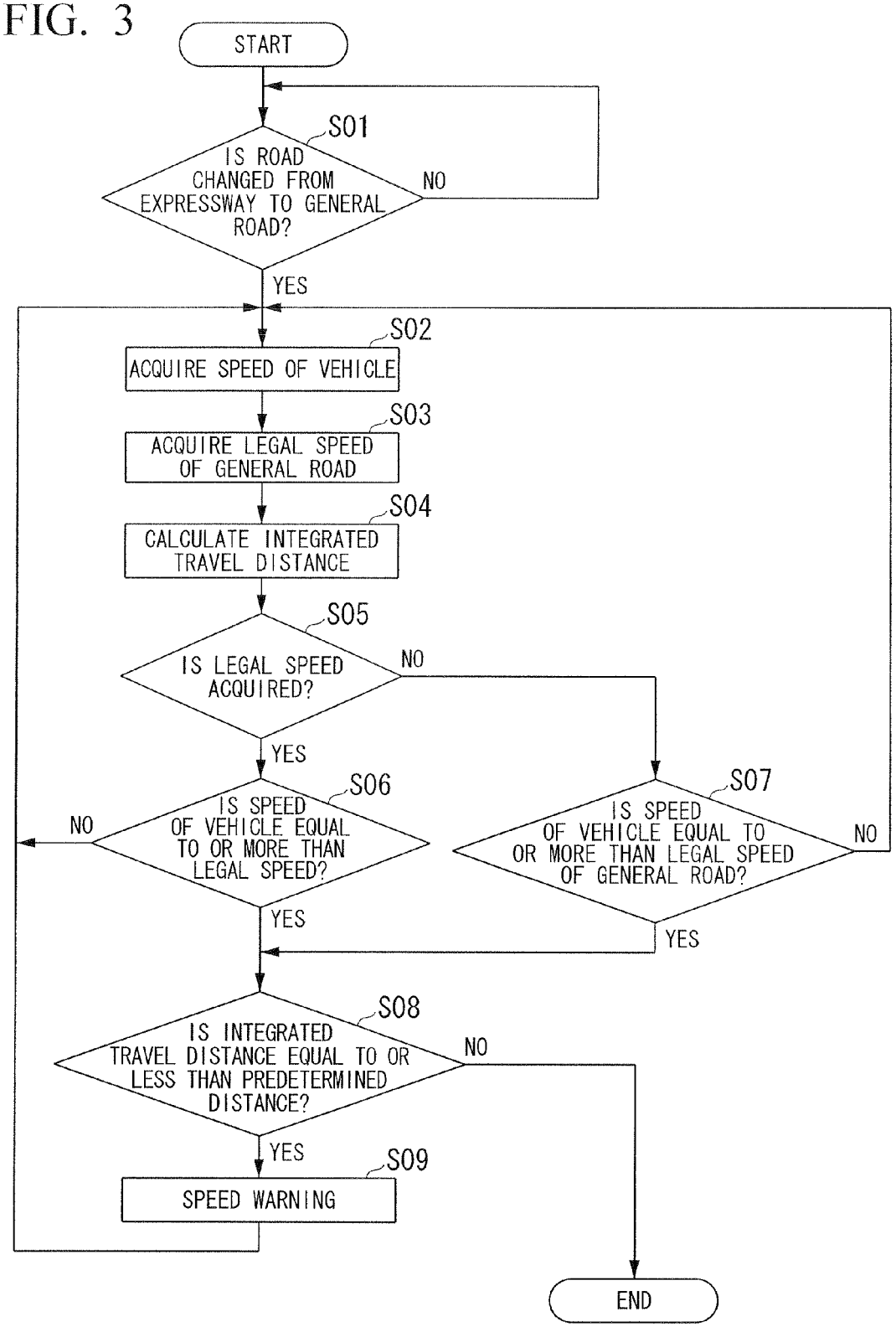
FIG. 3 is a flowchart illustrating the operation of the speed alarm system according to the embodiment.

For example, in Step S01 of FIG. 3, it is determined whether the type of road on which the vehicle travels changes from the expressway to the general road.

If the determination result is "NO", the determining process of Step S01 is repeatedly performed.

On the other hand, if the determination result is "YES", the process proceeds to Step S02.

In Step S02, the speed of the vehicle is acquired.

In Step S03, the speed limit of the general road which the vehicle enters is acquired.

Then, in Step S04, the integrated travel distance of the vehicle on the general road which the vehicle has entered is calculated.

Then, in Step S05, it is determined whether the acquisition of the speed limit of the general road which the vehicle enters has been completed.

If the determination result is "YES", the process proceeds to Step S06.

On the other hand, if the determination result is "NO", the process proceeds to Step S07.

In Step S06, it is determined whether the speed of the vehicle is equal to or more than the speed limit.

If the determination result is "NO", the process returns to Step S02.

On the other hand, if the determination result is "YES", the process proceeds to Step S08.

In Step S07, it is determined whether the speed of the vehicle is equal to or more than the legal speed (for example, 60 km/h) of the general road.

If the determination result is "NO", the process returns to Step S02.

On the other hand, if the determination result is "YES", the process proceeds to Step S08.

In Step S06, it may be determined whether the speed of the vehicle is equal to or more than the speed more than the speed limit by a predetermined speed α (the speed limit+the predetermined speed α).

In Step S07, it may be determined whether the speed of the vehicle is equal to or more than the speed more than the legal speed by a predetermined speed β (the legal speed+the predetermined speed β.

In Step S08, it is determined whether the integrated travel distance of the vehicle on the general road which the vehicle has entered is equal to or less than a predetermined distance (for example, 1 km).

If the determination result is "YES", the process proceeds to Step S09. In Step S09, at least a predetermined visual or auditory alarm is given to the occupant in the vehicle, and the process returns to Step S02.

On the other hand, if the determination result is "NO", the process ends.

Next, a process when the vehicle enters a different type of road, for example, when the type of road on which the vehicle travels changes from a main road to a minor street will be described below.

Figure 4:
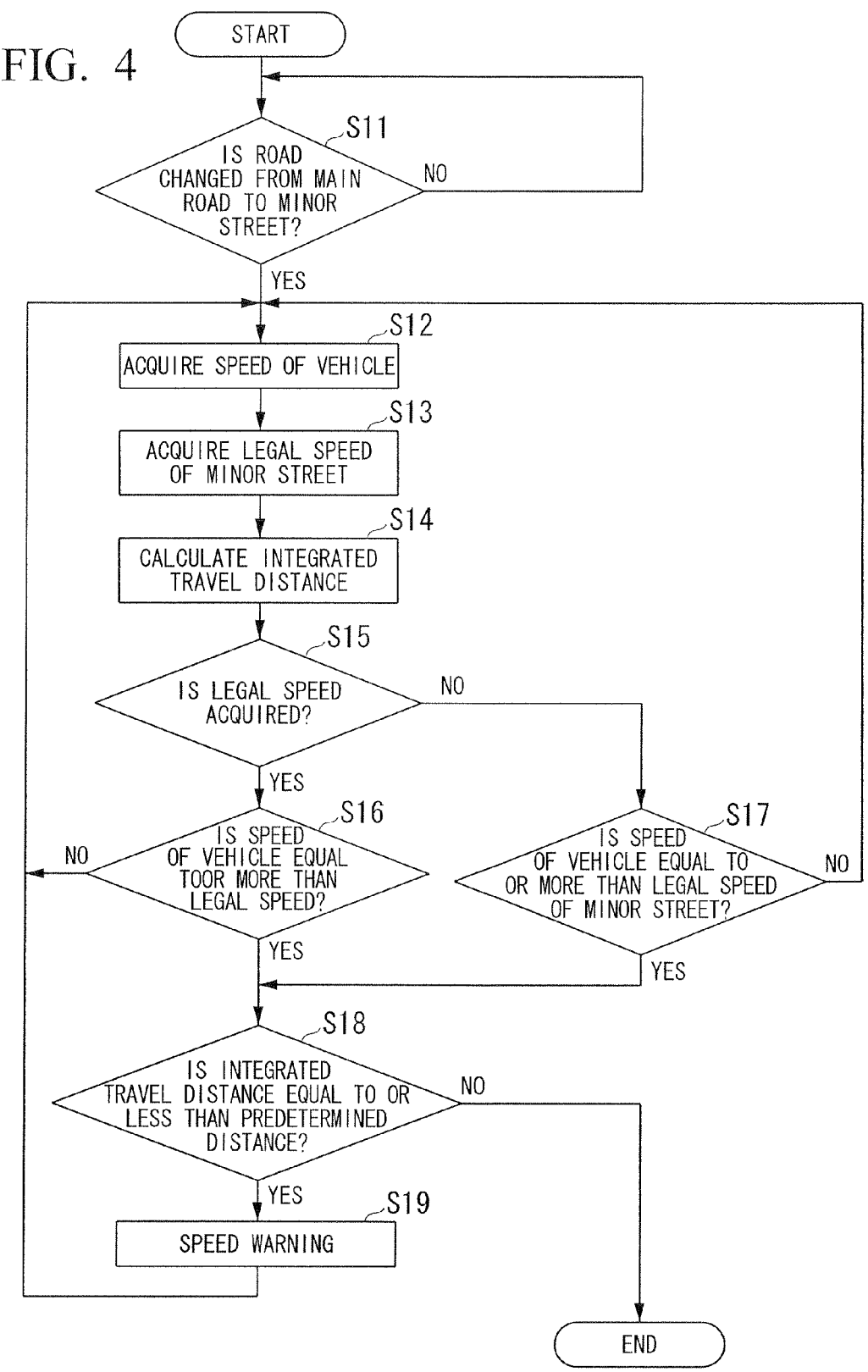
FIG. 4 is a flowchart illustrating the operation of the speed alarm system according to the embodiment.

For example, in Step S11 of FIG. 4, it is determined whether the type of road on which the vehicle travels changes from the main road to the minor street.

If the determination result is "NO", the determining process of Step S11 is repeatedly performed.

On the other hand, if the determination result is "YES", the process proceeds to Step S12.

In Step S12, the speed of the vehicle is acquired.

In Step S13, the speed limit of the minor street which the vehicle enters is acquired.

Then, Step S14, the integrated travel distance of the vehicle on the minor street which the vehicle has entered is calculated.

In Step S15, it is determined whether the acquisition of the speed limit of the vehicle on the minor street which the vehicle enters has been completed.

If the determination result is "YES", the process proceeds to Step S16.

On the other hand, if the determination result is "NO", the process proceeds to Step S17.

In Step S16, it is determined whether the speed of the vehicle is equal to or more than the speed limit.

If the determination result is "NO", the process returns to Step S12.

On the other hand, if the determination result is "YES", the process proceeds to Step S18.

In Step S17, it is determined whether the speed of the vehicle is equal to or more than the legal speed (for example, 40 km/h) of the minor street.

If the determination result is "NO", the process returns to Step S12.

On the other hand, if the determination result is "YES", the process proceeds to Step S18.

In Step S16, it may be determined whether the speed of the vehicle is equal to or more than the speed more than the speed limit by a predetermined speed α (the speed limit+the predetermined speed α).

In Step S17, it may be determined whether the speed of the vehicle is equal to or more than the speed more than the legal speed by a predetermined speed β (the legal speed+the predetermined speed β.

In Step S18, it is determined whether the integrated travel distance of the vehicle on the minor street which the vehicle has entered is equal to or less than a predetermined distance (for example, 200 m).

If the determination result is "YES", the process proceeds to Step S19. In Step S19, at least a predetermined visual or auditory alarm is given to the occupant in the vehicle, and the process returns to Step S12.

On the other hand, if the determination result is "NO", the process ends.

As described above, according to the speed alarm system 10 of the embodiment, even when the type of the road on which the vehicle travels is changed and the driver drives the vehicle at a speed higher than the speed limit (that is, the established speed limit allowed by law for the road) without realizing it, it is possible to appropriately warn the driver that the speed is higher than the speed limit. In addition, the speed alarm system can prevent the driver from being repeatedly and excessively warned against the driver's will by providing notification only when the integrated travel distance of the vehicle is equal to or less than a predetermined distance after the vehicle enters a different type of road.

Since a predetermined distance with respect to the integrated travel distance where the notice of speeding is permitted varies depending on the type of road, that is, the speed limit of the road, it is possible to appropriately set a traveling period for which the notice of speeding is permitted. Therefore, it is possible to prevent the occupant in the vehicle from becoming nervous.

When the vehicle travels from the expressway to a general road with a speed limit lower than that of the expressway, notification can be provided. Therefore, it is possible to appropriately warn the driver that the driver is speeding. As a result, it is possible to prevent the vehicle from traveling on the general road while maintaining the traveling state on the expressway.

When the vehicle travels from a main road to a minor street with a speed limit lower than that of the main road, notification can be provided. Therefore, it is possible to appropriately warn the driver that the driver is speeding. As a result, it is possible to prevent the vehicle from traveling on the minor street while maintaining the traveling state on the main road.

In the above-described embodiment, as shown in Steps S01 to S09, or Steps S11 to S19, a plurality of speed warnings can be given. However, only one speed warning may be given.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

It is possible to provide a speed alarm system capable of giving an appropriate speed warning while preventing the occupant in the vehicle from becoming nervous.

What is claimed is:

1. A speed alarm system comprising:
   a vehicle position detecting unit that detects a position of a vehicle;
   a map data storage unit that stores a map data including information on a type of a road and a speed limit of the road;
   an entrance determining unit that determines whether the vehicle enters a different type of road from the type of the road;
   an integrated travel distance detecting unit that detects an integrated travel distance on a road which the vehicle has entered and a speed detecting unit that detects a speed of the vehicle on the road which the vehicle has entered, when the entrance determining unit determines that the vehicle has entered the different type of road from the type of the road the vehicle entered from; and
   a notification unit that gives at least an auditory or visual alarm to an occupant of the vehicle when the integrated travel distance is equal to or less than a predetermined distance and the speed of the vehicle is higher than the speed limit.

2. The speed alarm system according to claim 1, wherein the predetermined distance varies depending on the type of the road which the vehicle has entered.

3. The speed alarm system according to claim 1, wherein the entrance determining unit determines whether the vehicle enters a general road with a relatively low speed limit from an expressway with a relatively high speed limit.

4. The speed alarm system according to claim 1,
wherein the entrance determining unit determines whether the vehicle enters a minor street with a relatively low speed limit from a main road with a relatively high speed limit.

5. The speed alarm system according to claim 1, wherein when the integrated travel distance is more than the predetermined distance and the speed of the vehicle is higher than the speed limit, the notification unit does not output a speed warning to the occupant of the vehicle.

6. The speed alarm system according to claim 1, wherein the speed detecting unit determines whether the speed of the vehicle is equal to or more than the speed limit by a predetermined speed; and
the notification unit gives the auditory or visual alarm to the occupant of the vehicle when the integrated travel distance is equal to or less than the predetermined distance and the speed of the vehicle is higher than the speed limit by the predetermined speed.

7. The speed alarm system according to claim 2, wherein the predetermined distance is reduced when the speed limit on the type of road is relatively low.

8. The speed alarm system according to claim 2, wherein the predetermined distance is increased when the speed limit on the type of road is relatively high.

* * * * *